UNITED STATES PATENT OFFICE.

HENRY W. JOSLIN, OF BROOKLYN, NEW YORK.

IMPROVED RUBBER-COATED LEATHER.

Specification forming part of Letters Patent No. 59,402, dated November 6, 1866.

*To all whom it may concern:*

Be it known that I, HENRY W. JOSLIN, of Brooklyn, in the county of Kings and State of New York, have invented a new and useful Improvement in Vulcanized India Rubber Coated Leather; and I do hereby declare that the following is a full, clear, and exact description of the same.

This invention consists in a fabric composed of leather coated with vulcanized india-rubber or gutta-percha previously prepared for vulcanization in the usual manner, in a plastic state, upon the leather, and afterward subjecting it to the cooking which constitutes a portion of the vulcanizing process, whereby the rubber or gutta-percha is caused to adhere to the leather with much greater tenacity and permanence than when united thereto by means of cement, as has heretofore been practiced, and whereby, as a consequence, the fabric is much better adapted to those uses for which strong water-proof fabrics are required.

To enable others to understand the nature of my invention, I will proceed to describe it.

The india-rubber or other vulcanizable gum is first prepared with sulphur, as required in the vulcanization thereof for other purposes, and, being then in a plastic condition, is evenly spread upon one side or surface of the leather by passing the leather, together with the aforesaid plastic rubber, through the calenders. The sheet of leather thus coated with the plastic rubber is placed, with the rubber downward, upon a steam-table heated to a temperature of from 250° to 270° of Fahrenheit, or, in other words, to a temperature sufficient to produce the vulcanization of the rubber placed thereon, a cold metallic plate being laid upon the upper surface of the leather to press it down upon the steam-table and keep it in its place. The rubber-coated leather is thus retained upon the heated table for about an hour and a half, during which time the plate placed upon the leather, as just mentioned, is temporarily removed about three times at nearly equal intervals, in order to allow the leather to cool, and thus prevent it from becoming too highly heated, and to avoid the injury that would result thereto by being thus overheated. During this period the cooking process is performed by the heat radiated or communicated from the heated steam-table on which it is placed, as just set forth, and the vulcanization of the rubber is thus completed; and inasmuch as the rubber or other gum is retained in the closest and most intimate contact with the surface of the leather during the entire cooking process just described, the said rubber or gum is caused to adhere to the surface of the leather with a tenacity greatly exceeding that with which sheets of rubber can be made to adhere to leather by means of cement in the manner heretofore adopted.

Instead of a steam-table, a plate heated to the required degree by any other suitable means might be employed in conducting the cooking process aforesaid.

Instead of being thus coated with rubber or other gum upon one side only, the leather may be coated therewith upon both sides or surfaces, the rubber upon one side of the leather, and afterward that upon the other side thereof, being cooked in the manner hereinbefore described.

What I claim as new, and desire to secure by Letters Patent, is—

The fabric composed of leather coated with vulcanized india-rubber or gutta-percha in the manner substantially as herein set forth.

H. W. JOSLIN.

Witnesses:
   J. W. COOMBS,
   A. LE CLERC.

J. E. Jouett,
Convertible Chair,
Nº 59,403.
Patented Nov. 6, 1866.
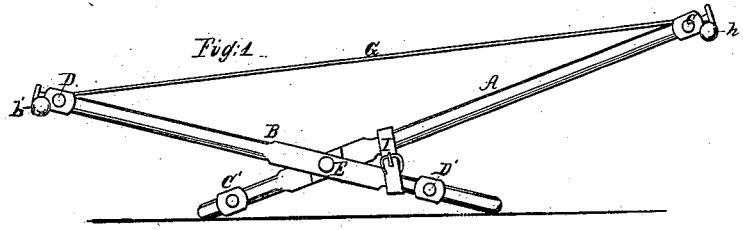
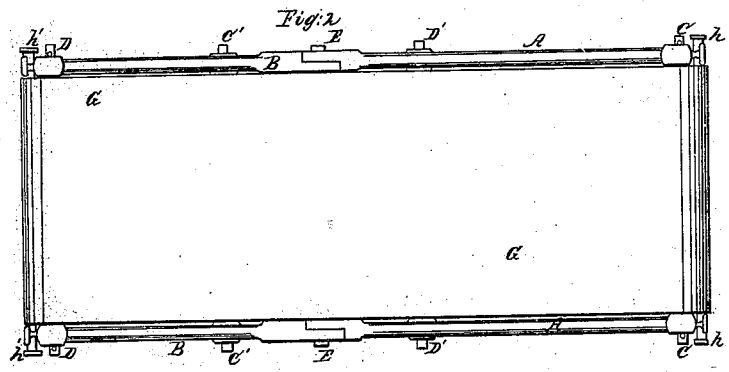
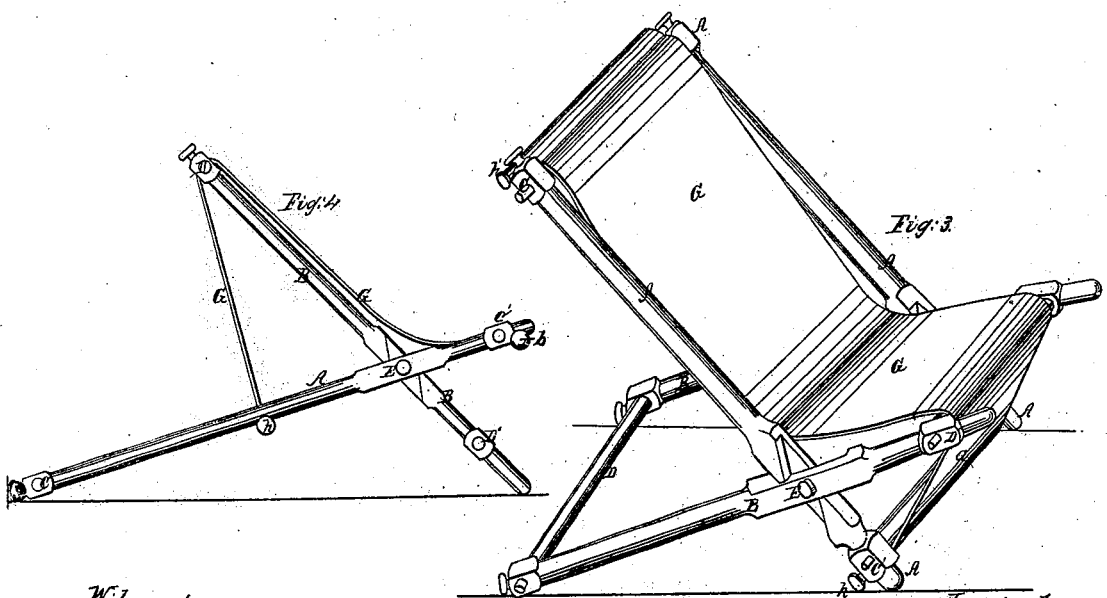
Witnesses
Charles Speer
Andrew de Lacy
Inventor
J. E. Jouett
By his attorney
J. N. McIntire